United States Patent [19]
Allen

[11] Patent Number: 5,104,138
[45] Date of Patent: Apr. 14, 1992

[54] TRAILER HITCH ASSEMBLY WITH READILY REMOVABLE TRAILER HITCH

[76] Inventor: Chester M. Allen, Rte. 7, Overhill Dr., Jonesborough, Tenn. 37659

[21] Appl. No.: 637,771

[22] Filed: Jan. 7, 1991

[51] Int. Cl.⁵ .............................................. B62D 53/06
[52] U.S. Cl. .................................. 280/433; 280/491.5; 280/511; 280/901
[58] Field of Search ..................... 280/433, 415.1, 901, 280/491.5, 511, 491.1, 438.1, 482, 490.1, 491.2; 403/324, 325, 379

[56] References Cited

U.S. PATENT DOCUMENTS

| | | | |
|---|---|---|---|
| 2,417,871 | 3/1947 | Heureman | 280/482 |
| 2,639,160 | 5/1953 | Studebaker et al. | 280/491.5 X |
| 3,404,901 | 10/1968 | Rau | 280/482 X |
| 3,870,342 | 3/1975 | Baxter et al. | 280/433 |
| 4,344,635 | 8/1982 | Welton | 280/414.1 |
| 4,546,994 | 10/1985 | Taylor | 280/901 X |
| 4,657,274 | 4/1987 | Mann et al. | 280/433 |
| 4,921,266 | 5/1990 | Beals | 280/433 X |
| 5,016,898 | 5/1991 | Works et al. | 280/433 |

FOREIGN PATENT DOCUMENTS

2205291 12/1988 United Kingdom ............. 280/491.5

Primary Examiner—Charles A. Marmor
Assistant Examiner—Kevin Hurley
Attorney, Agent, or Firm—Malcolm G. Dunn

[57] ABSTRACT

A trailer hitch assembly for use in the bed of pickup trucks and the like and including a trailer hitch supporting member secured to the underside of the pickup truck bed, a readily removable trailer hitch for seated and assembled relationship within the trailer hitch supporting member, and a spring-biased cylindrical rod for locking together the trailer hitch and the trailer hitch supporting member against vertical separation from each other while enabling the trailer hitch to be freely rotated relative to the trailer hitch supporting member, the cylindrical rod being manually movable against its spring-bias to a position to enable ready removal of the trailer hitch from the trailer hitch supporting member.

6 Claims, 4 Drawing Sheets

UNLOCKED POSITION

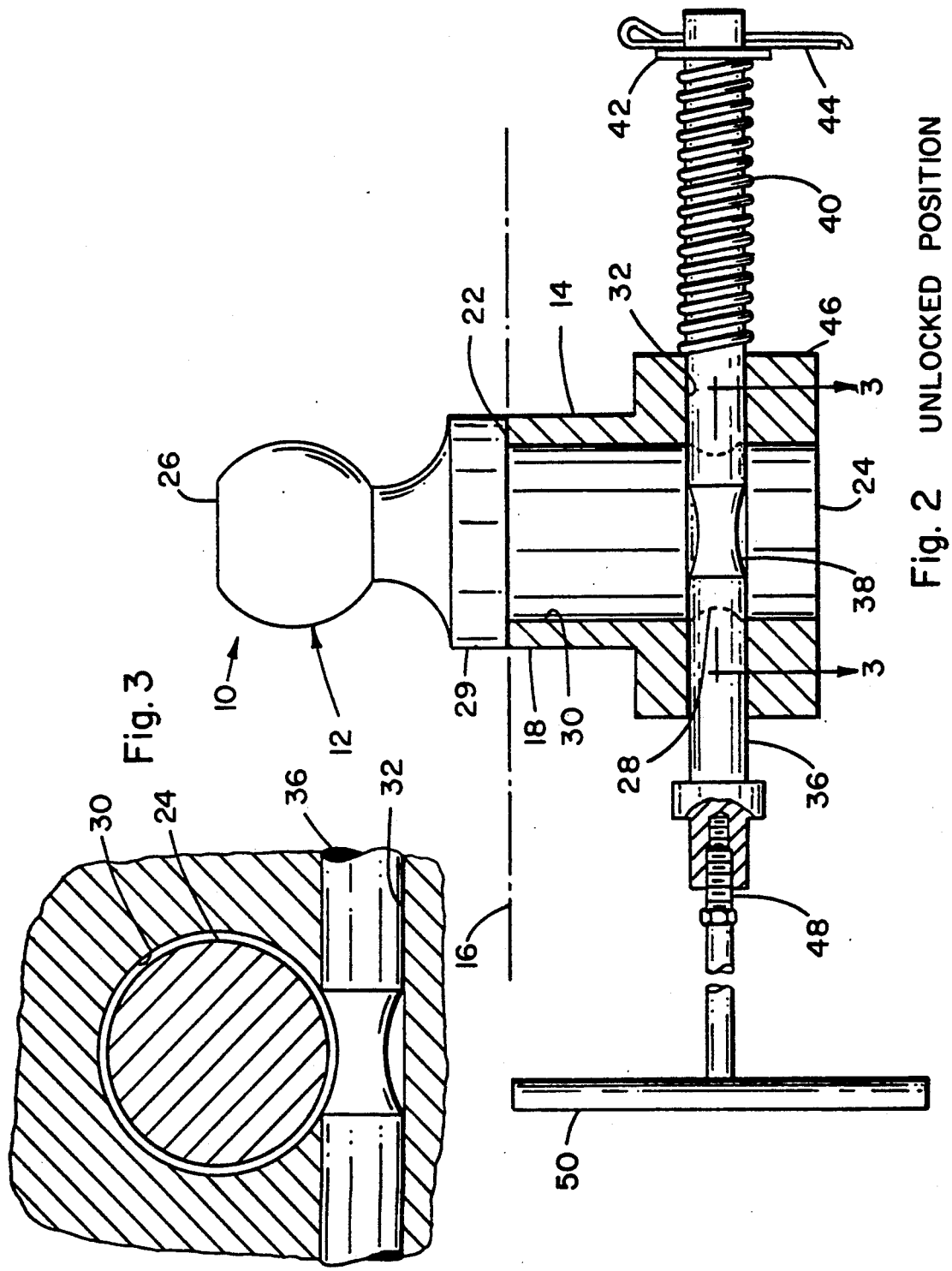

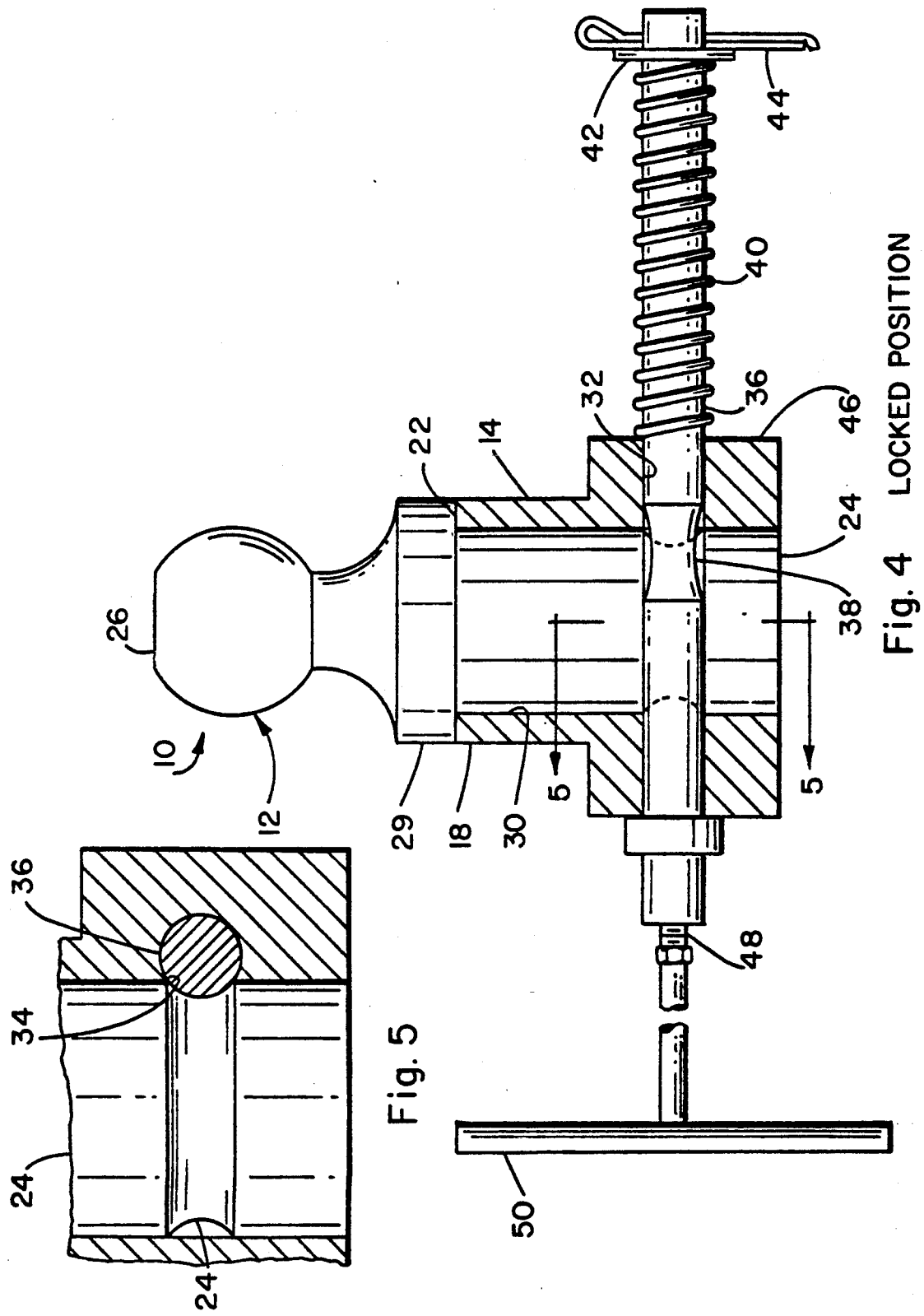

LOCKED POSITION

UNLOCKED POSITION

TRAILER HITCH ASSEMBLY WITH READILY REMOVABLE TRAILER HITCH

TECHNICAL FIELD

This invention relates to hitches or couples for connecting towed vehicles to towing vehicles such as pickup trucks and the like, and more particularly is directed to a trailer hitch assembly for use in the bed of pickup trucks and the like and having a readily removable trailer hitch.

BACKGROUND OF THE INVENTION

Hitchballs or ball hitches for connecting to gooseneck arrangements on trailers are usually bolted or permanently welded to the bed of pickup trucks and the like. The hitchball projects above the surface of the pickup truck bed and makes it difficult to lay large items flat in the bed when the pickup truck is not being used to tow trailers.

The prior art shows various arrangements to overcome this problem by providing removable or retractable hitchballs, such as disclosed in U.S. Pat. Nos. 3,659,876, 3,893,713, 4,256,324, 4,450,194, 4,546,994, 4,570,966, 4,657,274, and 4,921,266. A brief discussion about each follows.

U.S. Pat. No. 3,659,876 (1972) discloses a trailer hitch ball 15, which is bolted to a pickup truck bed, and it is indicated that the trailer hitch ball may be removed from the truck bed when desired so as not to interfere with other uses of the truck. Such removal, however, appears to require a person to go under the truck bed and to remove the nut secured to the downwardly projecting threaded stud 18, which is formed integral with the trailer hitch ball. The patent also discloses a hitch socket assembly 30, which forms a part of the gooseneck drawbar of a trailer and which is for coupling engagement with the hitch ball 15. A pair of pivotally mounted locking arms 35, 36 are connected to the downward extension 31 of the gooseneck drawbar and serve to lock the drawbar of the trailer to the hitch ball 15 at the reduced diameter neck of the hitch ball when the latter is engaged within the hitch socket assembly.

U.S. Pat. No. 3,893,713 (1975) discloses, on the other hand, a ball socket of a coupler 30, which is secured below the truck bed where it receives the ball 54 that is connected to a gooseneck trailer instead of being connected to the truck bed. A bed plate 16 is secured to the surface of the pickup truck bed and serves to support the coupler 30 beneath the truck bed. An access door 18 hinged to the bed plate covers up the opening to the coupler when it is not in use to receive the ball 54. A lock plate 32 is slidably connected to the bed plate below the surface of the truck bed and serves to engage the neck of the ball 54 to prevent its retraction from the ball socket of the coupler when engaged therein.

U.S. Pat. No. 4,256,324 (1981) discloses a hitch assembly 20, which is pivotally moved from a retracted, recessed position within or below the truck bed to an operative position where the ball hitch member 62 is projecting from the surface of the truck bed.

U.S. Pat. No. 4,540,194 (1985) discloses a hitch block 14 having a hitch ball at one end and being pivotally moved into a vertical towing position above the surface of a pickup truck bed or to an inoperative position below the truck bed by a manually controlled cable 38 connected to a pin 32 reciprocably mounted within the opposite end of the hitch block. Upon pulling the cable, the pin 32 is either released from hole 30 or 28 in an arcuate restraining member 24, depending upon whether the hitch block is to be moved to an operative vertical position or to an inoperative horizontal position. A hinged cover 52 is provided to cover the opening in the truck bed when the hitch block is in the inoperative position.

U.S. Pat. No. 4,546,994 (1985) discloses a flat, rectangular reinforcing bed plate 21 secured on top of the bed of a pickup truck or the like, the reinforcing bed plate having a rectangular hitch support sleeve 22 secured to the center thereof and aligned with a rectangular aperture 23 through the bed plate. A trailer hitch 28 has a base plate 29 and a rectangular post extending therefrom for receipt through the rectangular aperture 23 into the rectangular hitch support sleeve. The trailer hitch shown can readily be replaced with trailer hitches having different configurations, each of which can be safely latched in seated position under the aforementioned hitch support sleeve 22.

U.S. Pat. No. 4,570,966 (1986) discloses a retractable hitch ball controlled by a hydraulic cylinder operated from the cab of a truck that causes an elevating block 20 to be moved to cam the hitch ball 35 into upward operative position, and in the opposite direction of movement of the block 20, the hitch ball is enabled to be retracted through an opening in the truck bed. A closure plug 42 is provided for the truck bed opening.

U.S. Pat. No. 4,657,274 (1987) discloses a ball-like king pin 17, which is vertically reciprocated above and below the flat bed of a vehicle by a hand crank 30 located at an outside edge of the flat bed. The king pin is held in its upward position by a horizontal bolt 32 passing through a hole in the king pin. The bolt is removed from the king pin by a manually operated pull rod extending to the exterior of the vehicle so as to lower the king pin to the interior of the truck bed out of the way so that there will be no protrusions in the flat bed of the truck.

U.S. Pat. No. 4,921,266 (1990) discloses a fifth wheel hammer ball for gooseneck trailers. A removable ball coupling 18 has a threaded shaft 58, which is designed to be threadably received within an annular apertured hammer ball base plate 42. The latter forms a disk-like collar member 44, which is secured to the truck bed. The ball coupling is installed or "uninstalled" by an operator using a hammer in one direction or the other against outwardly projecting ears 64 connected to the ball coupling to tighten or loosen the threaded connection between the threaded shaft 58 of the ball coupling and the disk-like collar member 44.

DISCLOSURE OF THE INVENTION

In accordance with the present invention, I provide a trailer hitch assembly for use in the bed of pickup trucks and the like, the trailer hitch assembly including a readily removable trailer hitch. The trailer hitch has a cylindrical shaft defining at its one end a coupling arrangement for coupling cooperation to and with a trailer and the like, and at its other end spaced therefrom an annular groove formed within and around the surface of the cylindrical shaft.

A trailer hitch supporting member is adapted to be secured to the underside of the pickup truck bed and has a portion vertically extending upwardly through an opening in the pickup truck bed. The trailer hitch supporting member defines therein and therethrough the vertically extending portion a vertically extending first cylindrical bore adapted to receive therein in seated and assembled relationship the cylindrical shaft of the trailer hitch. The trailer hitch supporting member also defines a second cylindrical bore horizontally extending at right angles to and spaced from the first cylindrical bore and intersecting within the first cylindrical bore to define with and therethrough the first cylindrical bore and the second cylindrical bore at the intersection thereof a chordal slot. The chordal slot is opposite the annular groove in the trailer hitch when the latter is inserted in the aforementioned seated and assembled relationship.

A cylindrical rod having a predetermined length is adapted to be inserted in axially sliding relationship into the second cylindrical bore, and it has a portion thereof extending across and within the aforementioned chordal slot in contiguous mating relationship with the annular groove in the trailer hitch to lock the trailer hitch and the trailer hitch supporting member against vertical separation from each other when the trailer hitch is in the aforementioned seated and assembled relationship.

The cylindrical rod defines along its length at a predetermined location an annular groove formed within and around the surface of the cylindrical rod. The cylindrical rod is adapted to be axially slid along and within the second cylindrical bore until the annular groove in the cylindrical rod is aligned with the chordal slot opposite the annular groove in the trailer hitch so as to unlock the trailer hitch from the trailer hitch supporting member.

The cylindrical rod is normally biased into a position for locking the trailer hitch and trailer hitch supporting member against vertical separation from each other, as by means of a spring.

The vertically extending portion of the trailer hitch supporting member defines at its upper end a flat annular seating surface. The removable trailer hitch defines at its aforementioned one end of the cylindrical shaft a flanged portion of greater diameter than the cylindrical shaft and adapted to seat against the flat annular seating surface of the trailer hitch supporting member.

Since the cylindrical rod is normally biased, as by a spring, to a position for locking together the trailer hitch and trailer hitch supporting member, an abutment arrangement is provided for holding the cylindrical rod in a position for unlocking the trailer hitch from the trailer hitch supporting member.

The cylindrical rod has at one end a handle for grasping and enabling the cylindrical rod to be axially slid within the second cylindrical bore to a position for unlocking the trailer hitch and trailer hitch supporting member from each other.

BRIEF DESCRIPTION OF THE DRAWINGS

The details of my invention will be described in connection with the accompanying drawings, in which FIG. 1 is an elevational view of the trailer hitch assembly in installed position on the bed of a pickup truck or the like;

FIG. 2 is a cross-sectional view in elevation of the removable trailer hitch in seated position within the trailer hitch supporting member with the cylindrical rod slidably moved to the unlocked position so that the annular groove formed within and around the surface of the cylindrical rod is opposite to and aligned with the annular groove in the trailer hitch to enable removal of the trailer hitch from the trailer hitch supporting member;

FIG. 3 is a plan view in cross-section taken along line 3—3 of FIG. 2 and illustrating the alignment of the annular groove in the cylindrical rod with the annular groove in the trailer hitch;

FIG. 4 is a cross-sectional view in elevation of the removable trailer hitch in seated position within the trailer hitch supporting member with the cylindrical rod slidably moved to the locked position so that a portion of the cylindrical rod extends across and within the chordal slot in contiguous mating relationship with the annular groove in the trailer hitch to lock the trailer hitch and trailer hitch supporting member against vertical separation from each other;

FIG. 5 is a plan view in cross-section and taken along line 5—5 of FIG. 4 and illustrating the cylindrical rod in locked position with the trailer hitch and trailer hitch supporting member and also illustrating as best as possible the chordal slot;

BEST MODE FOR CARRYING OUT THE INVENTION

Figure 1:
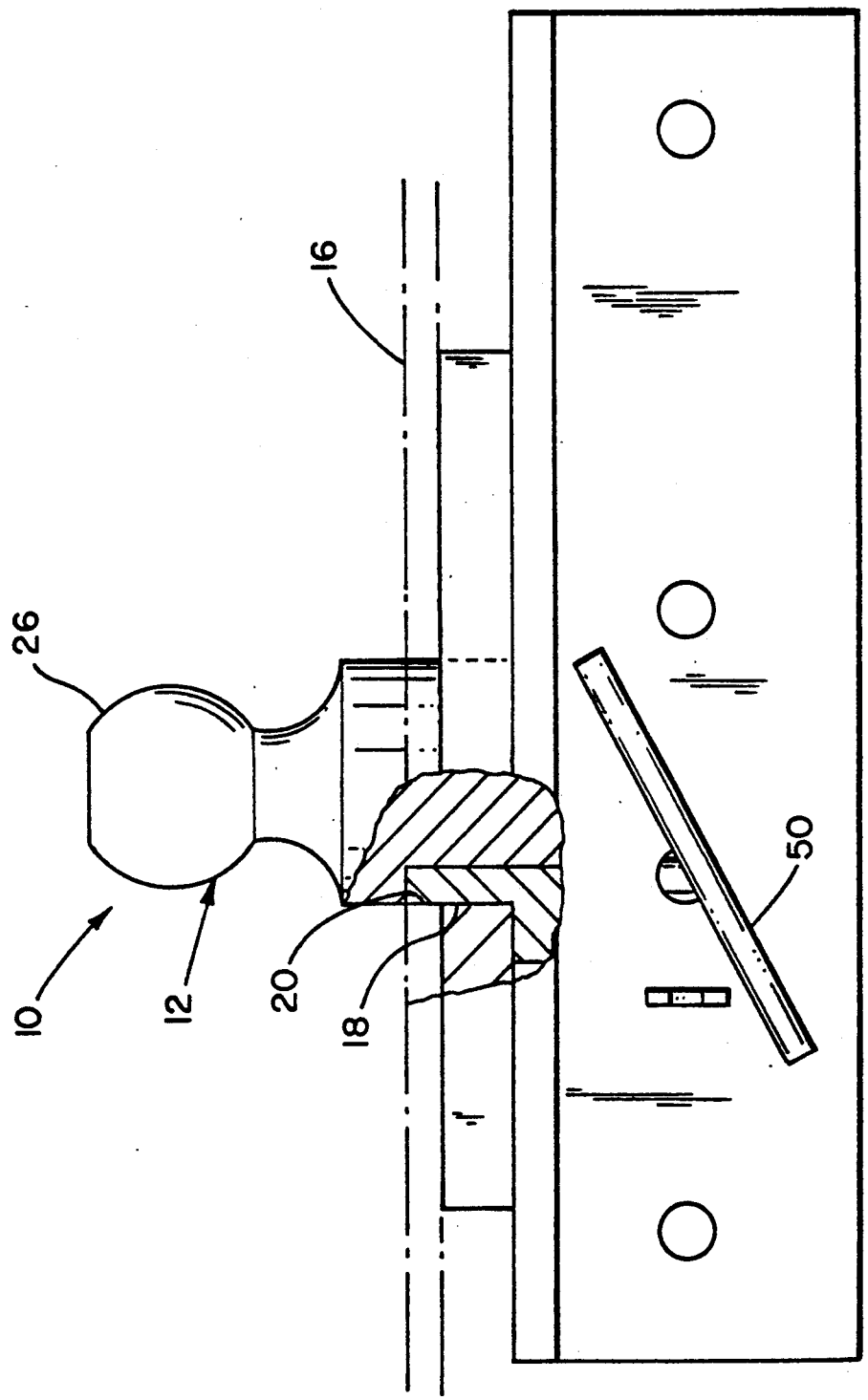

In reference to the drawings, the trailer hitch assembly shown at 10 includes a removable trailer hitch 12 seated within a trailer hitch supporting member 14.

The trailer hitch supporting member 14 is secured to the underside of the bed 16 of a pickup truck and has a portion 18, which extends vertically upwardly through an opening 20 in the pickup truck bed in such manner that its flat annular seating surface 22 is essentially flush with the surface of the pickup truck bed 16.

The removable trailer hitch 12 has a cylindrical shaft 24, which has at one end a coupling member, such as in the form of a ball or ball hitch 26, for coupling cooperation to and with a trailer (not shown). The cylindrical shaft 24 has at its other end spaced therefrom an annular groove 28, which is formed within and around the surface of the cylindrical shaft. The cylindrical shaft defines at its one end a flanged portion 29 of greater diameter than the cylindrical shaft, the flanged portion 29 being adapted to seat against the flat annular seating surface 22 of the trailer hitch supporting member 14.

The trailer hitch supporting member 14 also has therein a vertically extending first cylindrical bore 30, which is adapted to receive therein in seated and assembled relationship the cylindrical shaft 24 of the trailer hitch 12; and a second cylindrical bore 32, which extends horizontally at right angles to and spaced from the first cylindrical bore 30. The second cylindrical bore 32 also extends to the first cylindrical bore 30 to define with and therethrough the first cylindrical bore at the intersection thereof a chordal slot 34 (see FIG. 5), which will be opposite the annular groove 28 in the trailer hitch 12 when the trailer hitch is in seated and assembled relationship in the trailer hitch supporting member 14.

A cylindrical rod 36 is inserted in axially sliding relationship into the horizontally extending second cylindrical bore 32 until a portion of the cylindrical rod extends across the chordal slot 34 in contiguous mating relationship with the annular groove 28 in the trailer hitch to lock the trailer hitch 12 and the trailer hitch supporting member 14 against vertical separation from each other.

The cylindrical rod 36 has along its length at a predetermined location an annular groove 38, which is formed within and around the surface of the cylindrical rod. The cylindrical rod is adapted to be slid along and within the second cylindrical bore 32 until the annular groove 38 in the cylindrical rod is aligned with the chordal slot 34 opposite the annular groove 28 in the trailer hitch to unlock the trailer hitch 12 from the trailer hitch supporting member 14.

The cylindrical rod 36 is normally biased into a position for locking the trailer hitch and trailer hitch supporting member against vertical separation from each other by a spring 40. An annular thrust plate or washer 42 may be provided at one end of the cylindrical rod, as shown in FIGS. 2 and 4, against which one end of the spring 40 abuts, with the annular thrust plate or washer being held onto the cylindrical rod, as by a cotter pin 44. Obviously, other arrangements by which the thrust plate or washer may be held onto the cylindrical rod would function equally as well. The opposite end of the spring abuts against the enlarged base 46 of the trailer hitch supporting member 14.

The end of the cylindrical rod opposite where the spring 40 is located may, preferably, be threaded within to receive in threaded engagement the threaded end 48 of a handle 50, which is designed to extend to one side of the pickup truck bed so as to be readily grasped by the operator to release the trailer hitch from the trailer hitch supporting member without crawling beneath the bed of the pickup truck to cause such release. Obviously, if desired, the handle 50 and cylindrical rod 36 may be formed integrally or may be secured together in some other suitable manner.

Figure 7:
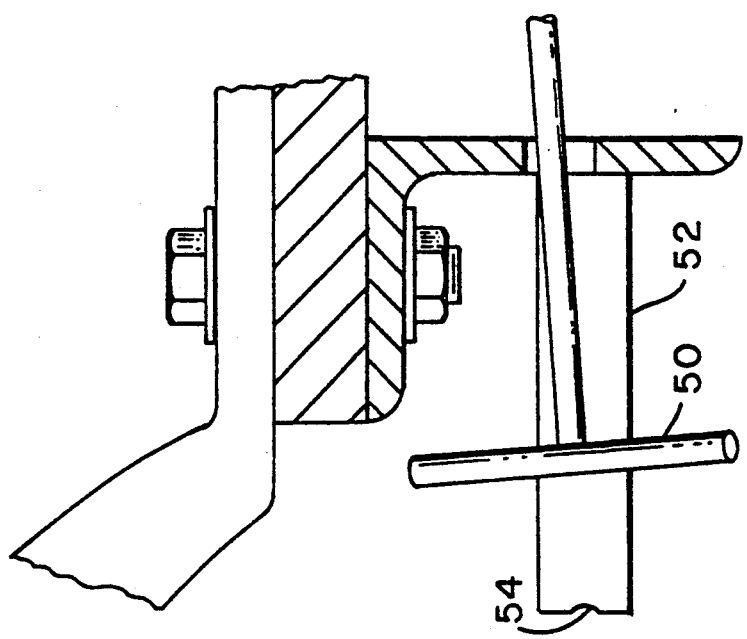
FIG. 7 is a view similar to FIG. 6, but showing the handle in a position that locks the trailer hitch and the trailer hitch supporting member against vertical separation from each other.

An abutment member 52 may be suitably secured to one side of the pickup truck bed so as to hold the handle in the unlocked position, when it is desired to remove the trailer hitch, thus enabling one person to unlock and remove the trailer hitch without assistance from others. The abutment member is provided at one end with a recessed notch 54 (see FIG. 17) in which the handle 50 is held in tension by the bias of the spring 40. When the trailer hitch and trailer hitch supporting member are locked together, the handle may assume the position shown in FIG. 7 relative to the abutment member 52.

Figure 8:
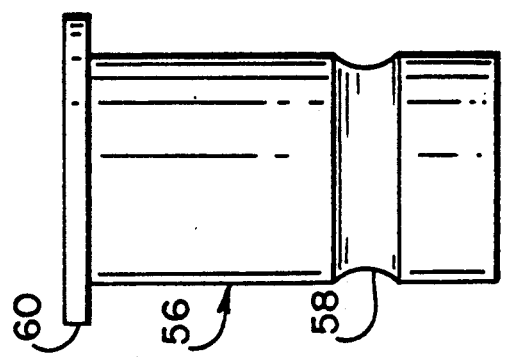
FIG. 8 is an elevational view of a cylindrical plug member for replacing the trailer hitch when the latter is not in the trailer hitch supporting member.
Figure 6:
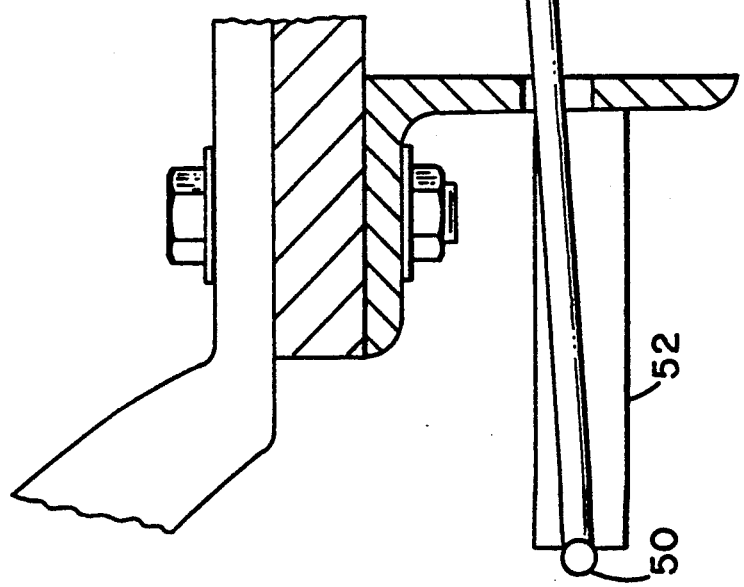
FIG. 6 is a fractional elevational view partly in cross-section of a pickup truck and illustrating the handle, which is connected to the cylindrical rod (not shown) for manually controlling the release of the trailer hitch, but shown in a position that unlocks the trailer hitch from the trailer hitch supporting member and also illustrates the abutment member secured to one side of the pickup truck for holding the handle in the unlocked position.

When the pickup truck operator wishes to remove the trailer hitch 12 so as to load something flat in the bed of the pickup truck, he may cover up the opening in the first cylindrical bore in the trailer hitch supporting member 14 by inserting in place of the trailer hitch a suitable cylindrical plug member 56, which may be made from plastic or other suitable light weight material, as illustrated in FIG. 8. The cylindrical plug member 56 may be releasably locked into position by similar contiguous mating engagement of the cylindrical rod within the annular groove 58 formed within and around the surface of the cylindrical plug member. The cylindrical plug member is provided with a flanged portion 60 at its upper end for seating against the flat annular seating surface 22 of the trailer hitch supporting member. In this manner the first cylindrical bore may be kept free from dirt and debris that might otherwise fall therein from the pickup truck bed surface when the trailer hitch has been removed.

In operation o the trailer hitch assembly, such as in preparation for towing a trailer and the like, and assuming that the cylindrical plug member 56 is in seated assembled relationship within the trailer hitch supporting member, the pickup truck operator simply grasps the handle 50 extending to one side of the pickup truck bed and pulls it back against the bias of the spring 40, and positions the handle within the recessed notch 54 of the abutment member 52 to hold it in the retracted position. In this latter described movement, the cylindrical rod is thus axially slid within the second cylindrical bore 32 until the annular groove 38 in the cylindrical rod becomes in alignment with the annular groove in the cylindrical plug member 56. This unlocks the cylindrical plug member from the trailer hitch supporting member and enables the operator to remove the cylindrical plug member and replace it with the trailer hitch 12. The operator then removes the handle from the recessed notch 54 in the abutment member 52 and allows the spring 40 to bias the cylindrical rod 36 into the locked position, as shown in FIGS. 4 and 5, where a portion of the cylindrical rod extends through the chordal slot 34 and contiguously mates within the annular groove in the trailer hitch to lock the trailer hitch and trailer hitch supporting member against vertical separation from each other. The trailer hitch is otherwise free to be rotated within its seated position within the first cylindrical bore 30 without becoming separated from the trailer hitch supporting member 14.

The invention has been described in detail with particular reference to preferred embodiments thereof, but it will be understood that variations and modifications can be effected within the spirit and scope of the invention.

I claim:

1. A trailer hitch assembly for use in the bed of pickup trucks and the like and having a removable trailer hitch, said trailer hitch assembly comprising:

said removable trailer hitch having a cylindrical shaft defining at its one end a coupling means for coupling cooperation to and with a trailer and the like and at its other end spaced therefrom an annular groove formed within and around the surface of said cylindrical shaft;

a trailer hitch supporting member adapted to be secured to the underside of said pickup truck bed and having a portion vertically extending upwardly through an opening in said pickup truck bed; said trailer hitch supporting member defining therein and through said vertically extending portion a vertically extending first cylindrical bore adapted to receive therein in seated and assembled relationship said cylindrical shaft of said trailer hitch;

said trailer hitch supporting member defining a second cylindrical bore horizontally extending at right angles to and spaced from said first cylindrical bore and intersecting within said first cylindrical bore to define with and therethrough said first cylindrical bore and said second cylindrical bore at the intersection thereof a chordal slot opposite said annular groove in said trailer hitch when the latter is in said seated and assembled relationship; and a cylindrical rod having a predetermined length and adapted to be inserted in sliding relationship into said second cylindrical bore and having a portion thereof extending across and within said chordal slot in contiguous mating relationship with said annular groove in said trailer hitch to lock said trailer hitch and said trailer hitch supporting member against vertical separation from each other when the trailer hitch is in said seated and assembled relationship.

2. A trailer hitch assembly as defined in claim 1, and wherein said cylindrical rod defines along its length at a predetermined location an annular groove formed within and around the surface of said cylindrical rod, said cylindrical rod adapted to be axially slid along and within said second cylindrical bore until said annular groove in said cylindrical rod is aligned with said chordal slot opposite said annular groove in said trailer hitch to unlock said trailer hitch from said trailer hitch supporting member.

3. A trailer hitch assembly as defined in claim 2, and wherein means is provided to bias said cylindrical rod normally into a position for locking said trailer hitch and said trailer hitch supporting member against vertical separation from each other.

4. A trailer hitch assembly as defined in claim 1, and wherein said vertically extending portion of said trailer hitch supporting member defines at its upper end a flat annular seating surface, and wherein said removable trailer hitch defines at its said one end of said cylindrical shaft a flanged surface of greater diameter than said cylindrical shaft and adapted to seat against said flat annular seating surface of said trailer hitch supporting member.

5. A trailer hitch assembly as defined in claim 2, and wherein means is provided for holding said cylindrical rod in a position for unlocking said trailer hitch and said trailer hitch supporting member.

6. A trailer hitch assembly as defined in claim 2, and wherein said cylindrical rod has at one end a handle for grasping and enabling said cylindrical rod to be axially slid within said second cylindrical bore to a position for unlocking the trailer hitch and trailer hitch supporting member from each other.

* * * * *